US012043532B2

(12) United States Patent
Poeschl

(10) Patent No.: US 12,043,532 B2
(45) Date of Patent: Jul. 23, 2024

(54) METHOD AND SYSTEM FOR CONTROLLING A CONTAINER HANDLING PLANT

(71) Applicant: KRONES AG, Neutraubling (DE)

(72) Inventor: Stefan Poeschl, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/838,834

(22) Filed: Jun. 13, 2022

(65) Prior Publication Data

US 2022/0396463 A1 Dec. 15, 2022

(30) Foreign Application Priority Data

Jun. 14, 2021 (DE) ..................... 10 2021 115 381.6

(51) Int. Cl.
*B67C 3/00* (2006.01)
*B67C 3/28* (2006.01)

(52) U.S. Cl.
CPC .............. *B67C 3/007* (2013.01); *B67C 3/287* (2013.01)

(58) Field of Classification Search
None
See application file for complete search history.

(56) References Cited

U.S. PATENT DOCUMENTS

2015/0212718 A1* 7/2015 Kellhammer ....... G06F 3/04842 715/771
2018/0039259 A1* 2/2018 Hoferer ................ G05B 19/042
2018/0321832 A1* 11/2018 Bielmeier ........... G06F 3/04847

FOREIGN PATENT DOCUMENTS

| | | | |
|---|---|---|---|
| CN | 107430400 A | 12/2017 | |
| DE | 102005035264 A1 | 2/2007 | |
| EP | 2803621 A1 | 11/2014 | |
| EP | 3022614 A1 | 5/2016 | |
| EP | 2803624 B1 | 2/2017 | |
| EP | 3378828 A1 * | 9/2018 | ............ B67C 3/007 |
| EP | 3378828 A1 | 9/2018 | |
| EP | 3495911 A1 | 6/2019 | |
| WO | WO 2016/146756 A1 | 9/2016 | |
| WO | WO 2019/048051 A1 | 3/2019 | |
| WO | WO 2019048051 A1 | 3/2019 | |

OTHER PUBLICATIONS

DE 10 2021 115 381.6 Search Report dated Feb. 2, 2022; 6 pages.
Extended European Search Report dated Nov. 22, 2022 from corresponding application No. EP 22178883.9, 8 pages.
Chinese Office Action dtd Feb. 21, 2024 for CN Application No. 202210665444.1, 8 pages.

* cited by examiner

*Primary Examiner* — Tanzim Imam
(74) *Attorney, Agent, or Firm* — Haynes and Boone, LLP

(57) ABSTRACT

Systems for controlling a container handling plant, for example a beverage filling plant, including at least one container handling station for handling containers, and an assigned control means for controlling a container handling process of the container handling station. The systems also include a means for automatic process adjustment and a development means that is in communication with the means for automatic process adjustment. The development means is configured to acquire real-time process data and to use the real-time process data to develop calculation rules for calculating process parameters.

9 Claims, 4 Drawing Sheets

METHOD AND SYSTEM FOR CONTROLLING A CONTAINER HANDLING PLANT

CROSS-REFERENCE TO RELATED APPLICATIONS

This application claims priority from German Patent Application No. DE 10 2021 115 381.6, filed on Jun. 14, 2021 in the German Patent and Trademark Office, the disclosure of which is incorporated herein by reference in its entirety.

BACKGROUND

Technical Field

The present invention relates to a method for controlling a container handling plant, in particular a beverage filling plant, comprising at least one container handling station, for handling containers, and an assigned control means, for controlling a container handling process of the container handling station, and to a system comprising a container handling plant.

Related Art

In the beverage filling industry, including plants and processes for filling beverages, producing, closing, labelling containers and the like, increasingly complex control systems are being used for automatically or semi-automatically effecting the settings of the industrial plants. For example, EP 3 495 911 A1 and WO 2019/048051 A1 describe methods for the automated adjustment of process parameters of a filling plant.

The commissioning of such a plant or changing of the product type, such as changing of the product to be filled or the container format, is effected, for example, by an operator selecting a previously created product type in the menu of an HMI module ("human-machine interface module"). Machine and process parameters (filling pressure, pressurisation time, filling curve, etc.) are stored as a data record for the selected product type, and are used to control the plant. Alternatively, the product types may be managed centrally in an LMS (line management system) and transferred to the corresponding plant as required.

The machine and process parameters for a desired product type, also referred to herein as "product type parameters", may be determined by use of algorithms, ranging from simple formulas to complex, rule-based calculation principles, in order to be able to react flexibly to different process and environmental conditions. These product type parameters are implemented in the control system for each product type when the machine is delivered and determine the subsequent filling process. Possible inputs for the algorithm are product-specific parameters (e.g. Brix level, $CO_2$ content, temperature, etc.), container-specific parameters (e.g. bottle size, headspace size, neck finish cross-section, etc.) and environmental parameters, from which the corresponding machine and process parameters are then determined algorithmically on a customer-specific basis. The algorithms in turn are developed on an ongoing basis by means of laboratory measurements.

The product type parameters implemented in the control system of a plant are rigid, and do not respond to product changes or to environmental changes, which can result in filling problems. Although the plant can be manually parameterised by an operator, this requires highly specialised technical knowledge. Manual parameterisation is made more difficult by the fact that the parameters often depend on each other. For example, an increase in the filling pressure results in a longer depressurisation time. Moreover, incorrect operation/parameterisation of the plant can result in damage and high costs.

SUMMARY

An improved control system of a container handling plant, for example a beverage filling plant, is described herein according to various embodiments. In one embodiment, parameterization of the control system is simplified.

The method according to the invention is for controlling a container handling plant. The container handling plant comprises at least one container handling station, for handling containers, and an assigned control means, for controlling a container handling process of the container handling station. The control means may be a constituent part of the container treatment station or be assigned directly or indirectly thereto, for example in the case of a higher-level plant control system.

The container handling plant may comprise a plurality of container handling stations, such that a plurality of handing operations, or handling steps, can be performed on the containers. The container handling plant may comprise, for example, one or more of the following container handling stations: a device for producing containers; a device for filling the containers with a fill product; a device for closing the containers with one container closure each; a device for labelling the containers; a device for checking the quality of the containers; a buffer for temporarily buffering containers and for compensating for any different processing/transport speeds between plant parts; a packing device for packing the filled containers.

In an exemplary embodiment, the container handling plant is a beverage filling plant, such that at least one of the container handling stations is a filling device, configured to introduce a fill product into the containers.

According to the invention, real-time process data are sent from the control means to a means for automatic process adjustment. The means for automatic process adjustment is in some embodiments an external means, i.e., in this case it is physically separated from the container handling plant. The real-time process data may be obtained by corresponding sensors that monitor the container handling process. The real-time process data relate, for example, to temperatures, pressures, fill levels and the like. Real-time process data may also be obtained by one or more cameras, which are included herein under the term "sensor".

The means for automatic process adjustment determines at least one process parameter by use of, i.e., taking into account, the received real-time process data. Process parameters are used to control the container handling plant, or the respective container handling station(s). As a rule, the means for automatic process adjustment will determine a plurality of process parameters from the real-time process data, for example a filling curve to be set, pressures, pressurisation and/or depressurisation times and the like.

The at least one process parameter determined in this way is written by the means for automatic process adjustment to the control means of the respective container handling station, resulting in adjustment of the container handling process.

Thus, substantially less expertise is required at the location of the container handling plant to commission and operate the plant, since the configuration and control of the plant are at least partially outsourced to the means for automatic process adjustment. A container handling plant optimised in this way can be configured particularly flexibly and operates in a more stable manner overall. The commissioning of the plant, changing of product type, performance optimisation, any troubleshooting, etc. is substantially faster and safer. This also reduces the amount of training required and causes fewer problems in the event of personnel fluctuations on the part of the users of the container handling plant. The centralised optimisation also helps to reduce waste on the customer side.

In addition, a central feedback of data from the container handling plant and the associated processing procedures is generated, which enables designs based on real values in the field. This "feedback loop" accelerates product development and product improvement on the manufacturer's side, as a stream of real data from the field is now available for plant designs, for laboratories and for new and further developments.

Communication between the control means and the means for automatic process adjustment may be wireless or wired, digital or analogue. This applies equally to all other electronic means described herein that are in communication with each other, i.e., that send and/or receive data/signals in at least one direction.

In certain embodiments, adjustment of the container handling process of the container handling station is effected by the means for automatic process adjustment at regular time intervals, for example every minute. In this way, particularly stable operation can be ensured. The adjustment in this case comprises at least the determination of one or more process parameters by the means for automatic process adjustment and the writing of the determined process parameters to the control means. The reading-out of the real-time process data may, but does not have to, be effected at the same frequency. Alternatively or additionally, the process adjustment may be triggered by an event. Such an event may be triggered by the real-time process data, for example if a threshold value is exceeded or not attained, or by a change in the machine configuration.

In various embodiments, the control means comprises, or is in communication with, a human machine interface ("HMI") module. The HMI module receives user inputs relating to the container handling process, generates user data therefrom and sends these data to the means for automatic process adjustment. The means for automatic process adjustment in this case takes the received user data into account in generating the process parameter, or the process parameter, i.e., the process parameters depend on the user data. In this way, user inputs can be processed externally and are incorporated into the operation of the plant, such that the control means, databases, algorithms, etc. on site can be less complex, which not only reduces the cost of acquiring and operating such a container handling plant, but also contributes to the stability of the operation and the flexibility of the plant.

The HMI module is in some embodiments a portable means, for example a smartphone or tablet, such that the user can provide the desired information regardless of location.

The user data provided by the user, or an operator, may relate, for example, to the current state of the container handling plant, for example information relating to any rejects, ambient temperature, fill product quality, etc., and/or relate to a desired state, for example in the case of a change of product type. For this purpose, installed on the HMI module there is in several embodiments a user app that receives the user inputs in as user-friendly a manner as possible. The complexity of the user app may be tailored to the technical expertise of the operator, for example posing questions to the user concerning the state and/or process behaviour of the container handling plant and/or of its at least one container handling station, which are answered by the user, for example, via multiple choice, continuous text or voice input.

In some embodiments, the real-time process data sent to the means for automatic process adjustment and/or the user data received from the HMI module are also acquired by a development means. The development means uses these data to develop calculation rules for calculating process parameters or configuration data. As a result of the feedback of data to a development means, product development and product improvement on the manufacturer's side can be significantly simplified and accelerated.

Thus, for example, calculation rules for product type parameters may be developed and/or optimised by the development means. These calculation rules receive as input, for example, product variables (Brix level, $CO_2$ content, product temperature, etc.), container format variables (container volume, headspace volume, neck finish cross-section, container shape, container material, etc.), plant capacity and the like, and calculate associated process parameters that can be stored as a selectable configuration in the corresponding control means and/or used by the means for automatic process adjustment. The aforementioned calculation rules may be optimised by self-learning algorithms, such that there can be continuous optimisation of the calculation rules and of process parameters as a result of the data feedback of the container handling plant from practical application. The term "calculation rule" in this case ranges from simple calculation formulas up to complex algorithms.

In certain embodiments, the means for automatic process adjustment further receives configuration data from a configurator. The configuration data determine, for example, the real-time process data to be used for determining the at least one process parameter, and/or at least one optimisation target (filler performance, minimisation of rejects, etc.). The configuration data are taken into account by the means for automatic process adjustment for the purpose of determining the process parameters. In this way, the means for automatic process adjustment, and thus indirectly the container handling plant, can be configured rapidly and easily without the requisite expertise having to be available on-site.

In various embodiments, the at least one container handling station is a filling device for filling containers with a fill product. Possible fill products, in several embodiments, are beverages, for example water (still or carbonated), soft drinks, juices, beer, wine, dairy products, mixed drinks and the like. Filling devices are complex in terms of their mechanical design, and their commissioning, configuration, etc. is normally scarcely possible without in-depth technical knowledge. The partial or complete outsourcing of these tasks to an (external) means for automatic process adjustment is therefore of particular importance in the case of a beverage filling plant comprising a filling device.

In this case, the process parameters determined by the means for automatic process adjustment may include, for example, one or more of the following: filling pressure, pressurisation time, pressurisation pressure, filling rate, filling curve, depressurisation time and/or tank pressure. Alternatively or additionally, the real-time process data to be obtained may include information relating to one or more of the following variables: Brix level of the fill product, $CO_2$ content of the fill product, fill product temperature, fill level, headspace volume of the filled container.

A system comprising a container handling plant, for example a beverage filling plant, comprising at least one container handling station, for handling containers, and an assigned control means, for controlling a container handling process of the container handling station, and a means for automatic process adjustment, is also described herein according to various embodiments.

The means for automatic process adjustment is constructed and configured to receive real-time process data, in some embodiments acquired by one or more sensors of the container handling plant, from the control means, to determine at least one process parameter in consideration of, i.e. in dependence on, the received real-time process data, and to write the determined at least one process parameter to the control means, as a result of which the container handling process of the container handling station is adjusted.

The technical effects, advantages and embodiments described above with respect to the method apply analogously to the system.

Thus, for the reasons stated above, an HMI module is in various embodiments provided that is a constituent part of or in communication with the control means, the HMI module being configured to receive user input relating the container handling process, to generate user data therefrom and to send these data to the means for automatic process adjustment, the means for automatic process adjustment in this case being configured to determine the at least one process parameter further taking into account the received user data. The HMI module in this case is in several embodiments a portable means, such as a smartphone or tablet having an installed user app.

In certain embodiments, for the reasons stated above, the system further comprises a development means that is in communication with the means for automatic process adjustment and that is configured to acquire the real-time process data sent to the means for automatic process adjustment and/or the user data received from the HMI module and, taking account of the same, to develop calculation rules for calculating process parameters, for example by use of self-learning algorithms.

In various embodiments, for the reasons stated above, the system further comprises a configurator that is configured to send configuration data to the means for automatic process adjustment, the means for automatic process adjustment in this case being configured to receive the configuration data and to determine the at least one process parameter further taking into account the received configuration data.

In various embodiments, for the reasons stated above, the at least one container handling station is a filling device for filling containers with a fill product, in particular a beverage.

In this case, the process parameters to be determined by the means for automatic process adjustment include one or more of the following: filling pressure, pressurisation time, pressurisation pressure, filling rate, filling curve, depressurisation time and/or tank pressure. The real-time process data to be obtained for this purpose may include information relating to one or more of the following variables: Brix level of the fill product, $CO_2$ content of the fill product, fill product temperature, fill level, headspace volume of the filled container.

Further advantages and features of the present invention will be apparent from the following description of exemplary embodiments. The features described therein may be implemented singly or in combination with one or more of the features set out above, insofar as the features are not mutually conflicting. Exemplary embodiments are described in the following with reference to the accompanying drawings.

BRIEF DESCRIPTION OF THE FIGURES

Further embodiments of the invention are explained in more detail by the following description of the figures.

DETAILED DESCRIPTION

In the following, exemplary embodiments are described on the basis of the figures. In these figures, elements that are identical, similar or of equivalent effect are denoted by identical references, and in some instances description of these elements is not repeated, in order to avoid redundancy.

Figure 1:
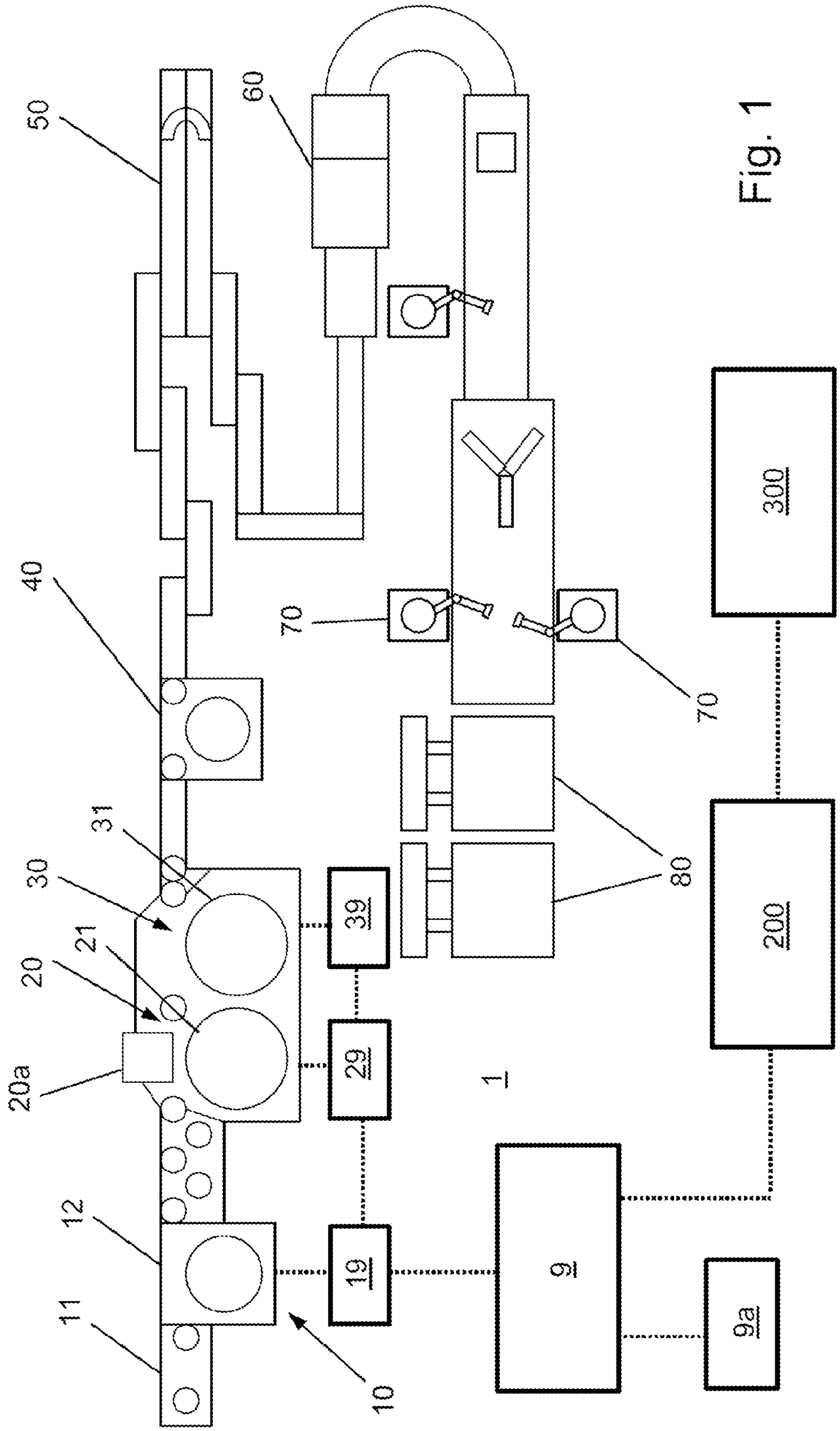
FIG. 1 shows a schematic representation of a system having a beverage filling plant, according to an exemplary embodiment, comprising a device for filling containers with a fill product.

FIG. 1 shows a system having a schematically represented beverage filling plant 1, which comprises a plurality of container handling stations. The beverage filling plant 1 is an example of a container handling plant, at least one of the container handling stations in this case being a device 20 for filling the containers (not shown in FIG. 1) with a fill product, in particular a beverage.

According to the present exemplary embodiment, the beverage filling plant 1 comprises the following container handling stations: a device 10 for producing containers, also referred to herein as a "container production device"; a device 20 for filling the containers with a fill product, also referred to herein as a "filling device"; a device 30 for closing each of the containers with a container closure, for example a crown cork or screw cap, also referred to herein as a "closing device"; a device 40 for labelling the containers, also referred to herein as a "labeller"; a buffer 50 for temporarily buffering filled and labelled containers and for compensating for any different processing/transport speeds between plant parts; a packing device 60 for packing the containers; robots 70 for creating layers; and a palletiser 80 that combines the packed containers on load carriers.

The beverage filling plant 1 accordingly comprises one or more container handling stations, which are passed through successively, for example from the production of the containers to their filling, closing, labelling and packing. For this purpose, the containers, or their preforms, being a preliminary stage of the containers before blow forming or stretch blow forming, are transported along a conveyor path. Transporting is effected by means of conveyor stars, conveyor belts and the like, which are in part represented schematically in FIG. 1. Preforms, containers, container closures and holders/clamps configured for these are not represented in FIG. 1 for reasons of clarity. Transport means such as conveyor stars or conveyor belts may be used solely for conveying or may be equipped with handling elements appropriate to the treatment stations.

The container handling stations of the beverage filling plant 1 shown in FIG. 1 are merely exemplary. The container handling plant, or beverage filling plant 1, may thus be equipped with further or alternative container handling stations such as, for instance, a cleaning device, a checking device for quality assurance, for example for checking whether foreign particles have entered the filled containers, and the like. Likewise, stations may be omitted, such as, for instance, the container production device 10, if the containers are already delivered in the final form to be filled, the buffer 50, the packing device 60, and/or others.

The container production device 10 has a means 11 for preparing and preheating preforms made of plastic, for example polyethylene terephthalate (PET). The preforms prepared in this way are transferred to a blow-forming means 12, in which the heated preforms are expanded by blowing or stretch-blowing to form the containers to be filled. For this purpose, the preforms are supplied with a gas under pressure in blow moulds whose cavity contour corresponds to the intended outer shape of the container, and in the case of stretch blowing are also expanded by means of a stretch rod/stretch bar, in order to bring the preforms into the desired container shape. The container production device 10 may include a device, not represented further, for cleaning, sterilising and/or coating the containers.

The containers produced in this way are transferred to the filling device 20. In the exemplary embodiments of FIGS. 1 and 2, the filling device 20 is based on a revolving design. For this purpose, it comprises a filler carousel 21, provided on the outer circumference of which there is a multiplicity of filling elements (not represented in FIG. 1), which are configured to introduce the fill product into the containers. The filling device 20 may comprise a mixer 20*a* configured to produce a fill product composed of a plurality of components, for example by mixing syrup into a stream of drinking water.

After filling, the containers are transferred to the closing device 30, which likewise may be of a revolving design. For this purpose, the closing device 30 comprises a closer carousel 31, provided on the outer circumference of which there is a multiplicity of closing elements (not represented in FIG. 1), each of which is configured to close the filled containers with a container closure.

The transfer of the filled containers from the filling device 20 to the closing device 30 may be effected directly from the filler carousel 21 to the closer carousel 31 or by means of one or more transfer stars. Alternatively, the filling device 20 and the closing device 30 may be integrated to form a filler/closer in which the filling and closing processes are effected at different handling angles of one and the same handling carousel.

Figure 2:
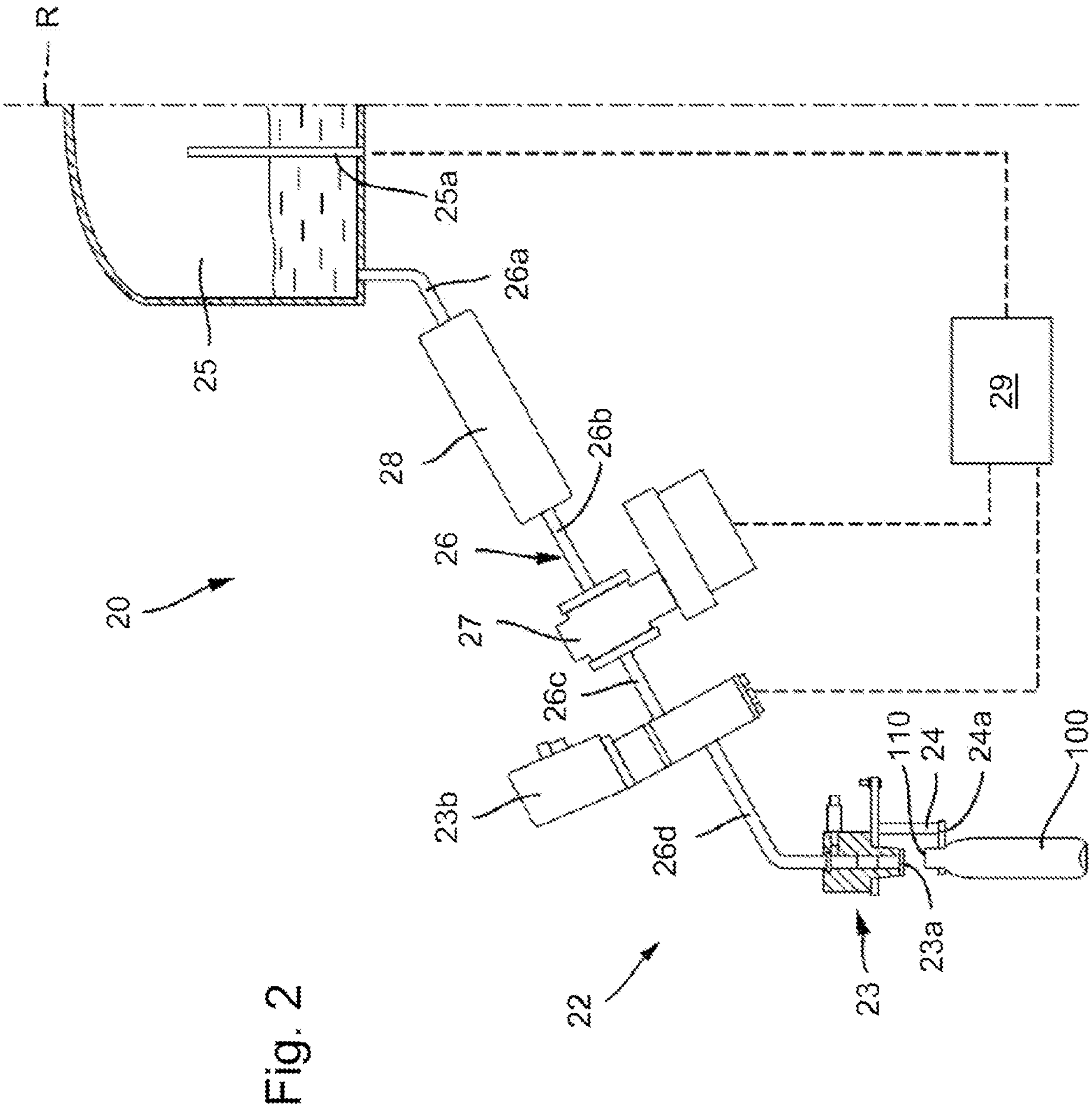
FIG. 2 shows a schematic representation of the device for filling containers with a fill product, according to an exemplary embodiment.

An exemplary device 20 for filling containers 100 with a fill product is shown schematically in FIG. 2.

In the exemplary embodiment shown in FIG. 2, the filling device 20 comprises a filling valve 23 that introduces a fill product into the container 100 via a valve mouth 23*a*. Possible fill products, in some embodiments, are beverages, for example water (still or carbonated), soft drinks, juices, beer, wine, dairy products, mixed drinks and the like.

During the filling process, the neck finish 110 of the container 100 is in several embodiments in pressure-tight contact with the filling valve 23, enabling the filling process to be performed as a counter-pressure process or a vacuum process. However, the filling valve 23 may also be realized as a free-jet valve, such that the fill product is filled into the neck finish 110 of the container 100 after bridging a free jet region. Further, the filling process and, if appropriate, a subsequent closing of the container 100 may be effected in a pressure-tight and vacuum-tight handling chamber (not shown in the figures), which makes it possible to provide a defined atmosphere with a defined pressure, for example in order to counteract any tendency of the fill product to foam over, or in order to close the container 100 in a defined gas atmosphere and/or under vacuum or gauge pressure.

During filling, the container 100 to be filled is held at or below the filling valve 23 by a container holder 24. The container holder 24 in some embodiments has a holding clamp 24*a* for holding the container 100 to be filled in the neck region, for instance beneath a neck ring of the container 100, not shown here. This is also referred to as "neck handling" of the container 100. "Neck handling" is used in particular for filling plastic containers in the form of PET bottles. In an alternative not shown in the figures, the container 100 to be filled may also be held, or supported, in its base region, for example by a guide plate, on which the container 100 to be filled stands. This is also referred to as "base handling" of the container 100. "Base handling" is used in particular for filling glass bottles. In an alternative likewise not shown in the figures, the container 100 to be filled may also be held and/or supported and transported in the region of the container body, or bottle belly, or in another suitable manner.

The filling valve 23 is in certain embodiments realized as, or comprises, a proportional valve 23*b* positioned before the valve mouth 23*a*, i.e., located upstream of the valve mouth 23*a*. Optionally, a shut-off valve may be provided in the region of the valve mouth 23*a* to open/close the valve mouth 23*a* as required. The proportional valve 23*b* is configured to vary the volume flow of the fill product, thus regulating the amount of fill product introduced into the container 100 per unit of time. The aim is to ensure efficient, accurate and product-conserving filling along a defined filling curve, which is generally a time-dependent function of the filling rate or of the volume flow.

The proportional valve 23*b* may be constructed in such a way, for example, that an annular gap, through which the fill product flows, can be varied in its dimension. The operating position of the proportional valve 23*b*, thus for example the currently switched size/dimension of the annular gap, is known and can be set in a reproducible manner, for example by use of a stepper motor to drive the proportional valve 23*b*.

The proportional valve 23*b* can be used to define one or more characteristics of the filling curve (cf. FIG. 3), such as the end of filling, when a desired fill level is reached, or the filling curve in its entirety.

The fill product is stored temporarily in a fill-product reservoir 25 before it is actually filled into the containers 100 to be filled, the fill-product reservoir 25 being shown here in the form of a central tank of a revolving filler. In an alternative embodiment, the fill-product reservoir 25 may also be realized in the form of a ring tank, a ring line or a distributor feed.

In the fill-product reservoir 25, the fill product is filled to a particular fill level and can flow from there, via a fill-product line 26, which here exemplarily has a first line portion section 26*a*, a second line section 26*b*, a third line section 26*c* and a fourth line section 26*d*, to the fill valve 23, and from there be introduced into the container 100 to be filled.

In addition to the proportional valve 23*b* for controlling or regulating the flow of fill product, a flow meter 27 is further provided, which is configured for detecting the fluid quantity, or the volume flow, of the fill product flowing through the fill-product line 26. By means of the flow meter 27, if necessary, the quantity of fill product introduced into the container 100 can also be determined, for instance by integrating or adding up the determined volume flow. In this way, after a desired fill product level has been reached in the container 100, the filling process can be terminated by closing the proportional valve 23*b* and/or by closing a shut-off valve, not shown here. As an alternative to the flow meter 27, other sensors may also be used, such as, for example, load cells and/or short-circuit probes. Alternatively, a sensor can be dispensed with if a time filling process is used that is based, for example, on calculation models for determining the volume flow.

The filling valve 23 including the proportional valve 23*b*, the flow meter 27 and sections of the fill-product line 26, such as the line sections 26*b*, 26*c* and 26*d*, may form a conceptual and/or structural unit, or component, which is referred to herein as a filling element 22.

The filling device 20 shown in FIG. 2 shows only one filling element 22, which is fluidically connected to the fill-product reservoir 25. In some embodiments, however, the filling device 20 has a multiplicity of filling elements 22, for instance arranged around the then common fill-product reservoir 25 and on the outer circumference of the filler carousel 21 (cf. FIG. 1), in order thereby to form a revolving filler. The filler carousel 21 rotates about an axis of rotation R, shown schematically, in order to fill the containers 100 during rotation and simultaneously transport them along a circular trajectory. For example, there may be more than 20 or 50 filling elements 22 arranged on the circumference of the filler carousel 21, such that it is feasible for a stream of containers 100 to be filled, fed to the revolving filler, to be filled in an efficient manner.

The filling device 20 may comprise—as a constituent part of or external to the filling element 22—one or more filters 28, which in several embodiments are arranged between the first section 26*a* and the second section 26*b* of the fill-product line 26. The filter 28 is configured to perform a cleaning of the fill product prior to filling, for example in order to filter out particles, viruses, bacteria, germs, fungi, etc. from the fill product.

The current fill level of the fill product in the fill-product reservoir 25 may be measured, for example, by means of a fill-level probe 25*a*.

The filling device 20 further comprises a filler control system 29, which is configured to communicate with the filling element 22. In particular, the filler control system 29 is in communication with the proportional valve 23*b*, the fill-level probe 25*a* and the flow meter 27, in order to define the current operating position of the proportional valve 23*b* by use of the volume flow values determined by the flow meter 27. Furthermore, an evaluation of the fill level in the fill-product reservoir 25 may be effected by means of the filler control system 29. The fill-level probe 25*a* and the flow meter 27 are, for example, sensors for monitoring the filling process.

Referring back to FIG. 1, the other container handling stations may also be equipped with corresponding control means; a container production control system 19 and a closer control system 39 are indicated as examples. The individual control means 19, 29, 39 may be implemented centrally or decentrally, as a constituent part of Internet-based and/or cloud-based applications, or in other ways, and may also access databases if necessary. The communication of the control means 19, 29, 39 with each other and/or with a higher-level plant control system 9 and/or with the components to be controlled, sensors to be read-out, etc. can be wireless or wired, digital or analogue. Furthermore, the control means 9, 19, 29, 39 do not have to be implemented by separate means, but may be partially or fully integrated.

The plant control system 9 may be realized as an LMS (line management system) that monitors and/or controls the various stations of the beverage filling plant 1, for example via communication with the subordinate, station-specific control means 19, 29, 39.

The filler control system 29 (possibly acting in combination with the plant control system 9) is configured to control the filling element 22 of the filling device 20 in such a way that the fill product is introduced into the container 100 in the desired quantity and at the desired rate. For this purpose, there may be one or more process parameter sets, which specify the process behaviour of the filling device 20, for example pressures, depressurisation times and the like, stored in the filler control system 29 or system control system 9. These parameter sets are usually preset and may be assigned, for example, to different fill product types that are to be filled.

Figure 3:
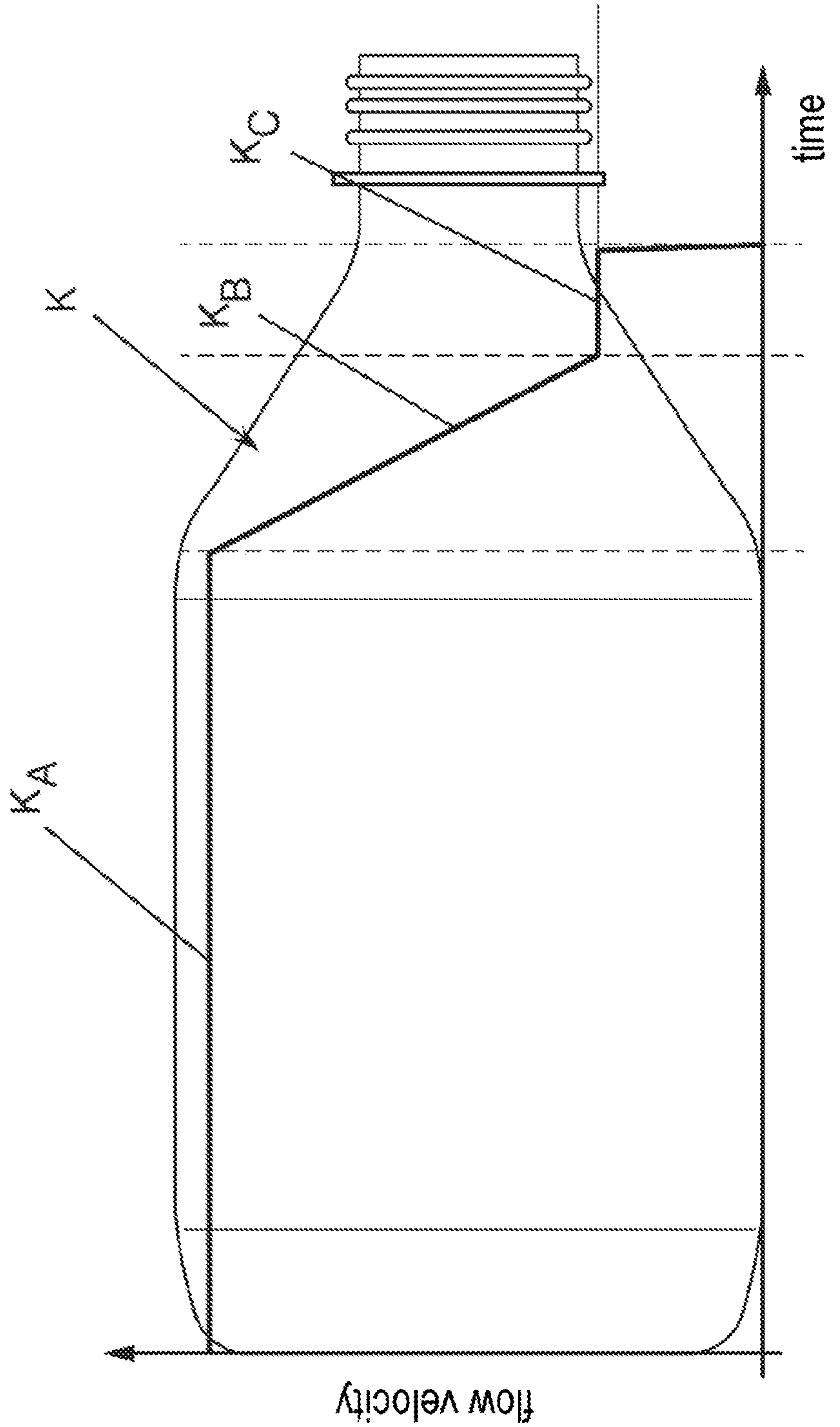
FIG. 3 shows an example of a filling curve, showing the filling rate as the fill product is introduced into a container, as a function of time.

In the simplest case, the fill product is introduced into the container 100 at a constant flow velocity, or a constant volume flow. A more complex, exemplary filling curve K, which represents the flow velocity when the fill product is introduced into the container 100 as a function of time, is shown in FIG. 3. According to this exemplary embodiment, the filling curve K may be divided into three sections KA, KB and KC.

At the beginning of the filling operation, in the filling curve section KA, filling is effected at a main flow velocity of, for example, 170 ml/s until a particular quantity of, for example, 795 ml is present in the container 100. Then, in the filling curve section KB, the flow velocity is reduced to the final flow velocity of, for example, 100 ml/s. The final flow velocity is reached at a filling quantity of, for example, 890 ml. This final flow velocity is then used to finish filling, in the filling curve section KC, until the desired filling quantity of, for example, 1000 ml is reached. This gives the filling time in nominal operation.

The actual shape of the filling curve K can depend on the fill product to be filled, container format (size, geometry, material, etc.), filler output and other variables. Commissioning of the beverage filling plant 1, a change of product type, a change of container format or the like is effected, for example, by an operator selecting a previously created configuration in the menu of an HMI module 9*a* ("human-machine interface module"), cf. FIG. 1. The HMI module 9*a* may be part of the plant control system 9, or communicate with it. Alternatively or additionally, the HMI module 9*a* may also communicate with one or more of the subordinate control means 19, 29, 39. The HMI module 9*a* may be a mobile communication means, for example a tablet or smartphone.

Of the selected configuration, process parameters (filling pressure, pressurisation time, filling curve, etc.) are stored as a data record in the plant control system 9 and/or the control means 19, 29, 39, which are used to control the beverage filling plant 1.

The plant control system 9 and/or one of the subordinate control means 19, 29, 39 are/is in communication with an electronic means 200 for automatic process adjustment of the beverage filling plant 1. The means 200, also referred to herein as "process adjustment means", is for example an external control system within the access range of the manufacturer of the container handling plant, or beverage filling plant 1.

The process adjustment means 200 calculates adjusted process parameters from real-time process data of the beverage filling plant 1, such as, for instance, sensor data, inputs from the operating personnel, camera recordings, etc., and writes them in some embodiments cyclically, for example every minute, to the plant control system 9 and/or into the subordinate control means 19, 29, 39 of the corresponding container handling stations, enabling the processing operation to be adjusted in real time to any change. The predefined process parameter sets in this case can be directly overwritten, or alternatively the process parameters generated/optimised by the process adjustment means 200 are written to another location and read-out and used there by the corresponding control means 9, 19, 29, 39.

With regard to the filling device 20, the process adjustment means 200 may calculate and, if necessary, vary for example process parameters, such as the filling pressure, the pressurisation time, filling rate, filling curve K, pause(s) and depressurisation time(s), from the real-time process data.

Alternatively or additionally, the adjusted process parameters calculated by the process adjustment means 200 may be optimised with inputs made by an operator into the HMI module 9*a* being taken into account. For this purpose, the HMI module 9*a* may be equipped with a user app 9*b* (cf. FIG. 4) that sends the operator's inputs, or data derived therefrom, to the process adjustment means 200. In various embodiments, the user app 9*b* is configured to pose questions to the operator concerning the state and/or process behaviour of the beverage filling plant 1 and/or of one or more container handling stations such as, for instance the filling device 20. These questions are answered by the operator, for example via multiple choice, continuous text, voice input or in another suitable manner.

Such optimisation of process parameters with the aid of a user app 9*b*, which accordingly communicates with the process adjustment means 200 via the HMI module 9*a*, has the advantage that substantially less expertise is required at the location of the beverage filling plant 1 for commissioning, a change of product type, troubleshooting, etc. The central feedback of data to the process adjustment means 200, which is in several embodiments located with the manufacturer, simplifies and stabilises the operation of the beverage filling plant 1. In addition, fewer product types, container formats, etc. can be preconfigured in the plant control system 9 or the subordinate control means 19, 29, 39, which further simplifies the operation and handling of the beverage filling plant 1.

The real-time process data sent to the process adjustment means 200 and/or the optimisations initiated via the user app 9*b* may also be acquired and used to develop calculation rules (calculation formulas, algorithms, etc.) from which the process parameters for controlling the beverage filling plant 1 are obtained. For this purpose, a development means 300 may be provided, which is in communication with the process adjustment means 200, or is a constituent part thereof, and is configured to generate and/or optimise, from the real-time process data and/or the optimisations initiated via the user app 9*b*, calculation rules for determining process parameters. The development means 300 may thus develop and/or optimise, for example, calculation rules for product type parameters of the filling device 20. These calculation rules receive, for example, as input product variables (Brix level, $CO_2$ content, product temperature, etc.), container format variables (container volume, headspace volume, neck finish cross-section, container shape, neck finish shape, container material, etc.), plant output and the like, and calculate associated process parameters that are stored as a selectable configuration in the plant control system 9 and/or in the corresponding control means 19, 29, 39, or are automatically used by the corresponding control means 9, 19, 29, 39. The aforementioned calculation rules may be optimised by self-learning algorithms, such that in practice a continuous and largely automated optimisation of the calculation rules, as well as process parameters, can be effected, due to the data feedback of the beverage filling plants 1.

Figure 4:
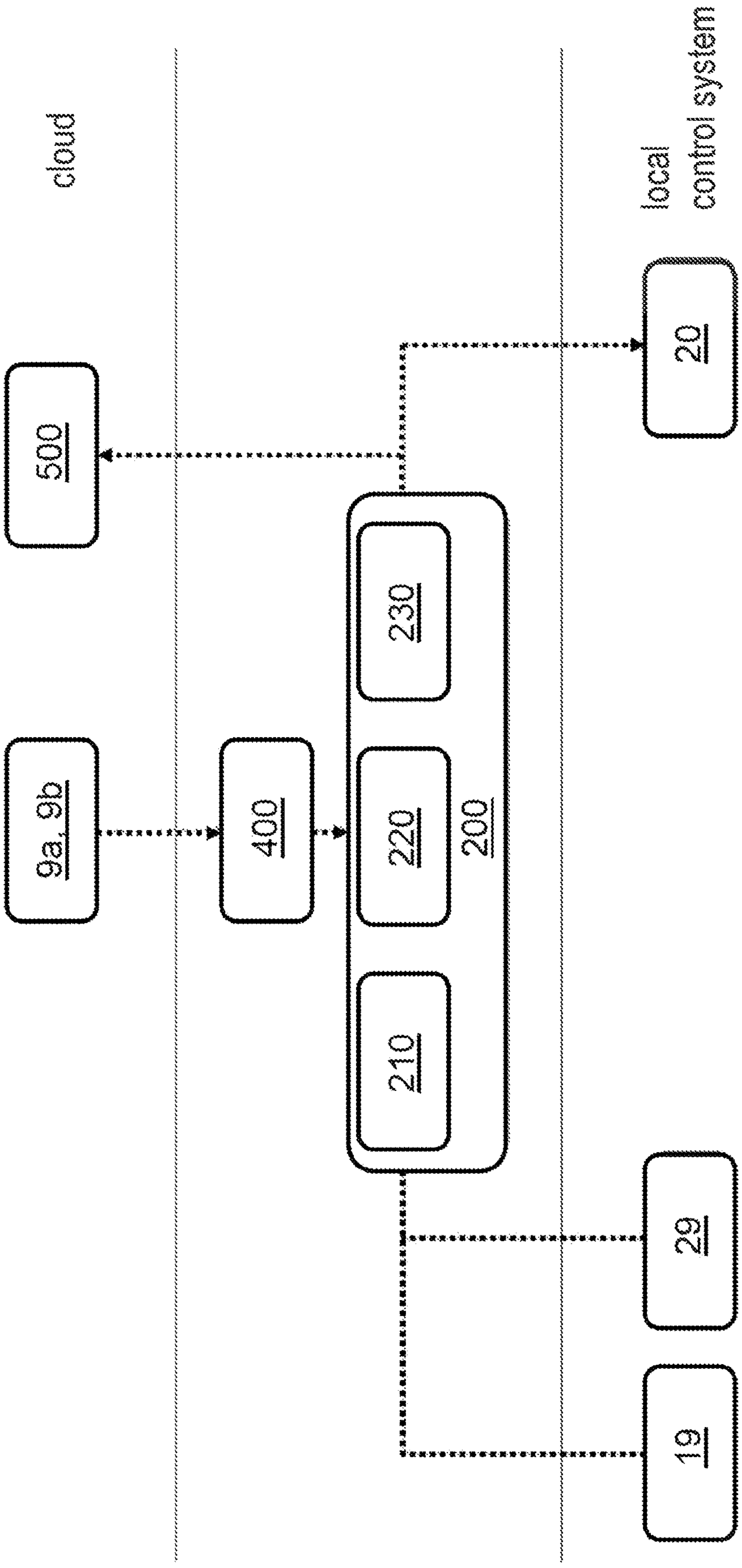
FIG. 4 shows a schematic diagram of the optimisation of the filling process, according to an exemplary embodiment.

FIG. 4 shows a schematic diagram of the filling process optimisation according to an exemplary embodiment.

In this example, the process adjustment means 200 obtains real-time process data from the container production control system 19 and the filler control system 29 for the purpose of automatic process adjustment. The real-time process data, recorded by sensors, cameras, etc., includes, for example, current fill levels, product quality (Brix level, $CO_2$ content, etc.), over-foaming tendency, flow-through measurements, pressures and the like.

The process adjustment means 200 further relates configuration data from a configurator 400, which configure the processing operation of the process adjustment means 200, for example determining what real-time process data to use in optimisation, and towards what optimisation goal (filler performance, minimisation of rejects, etc.) these are to be processed. The configuration data may ensue from or take into account user inputs from the HMI module 9*a*.

The process adjustment means 200 is equipped, for example, with a checking section 210 for checking the received data quality, a programmable logic section 220 for computing operations, an error processing section 230 for correcting and/or reporting any errors. From the aforementioned inputs from the container production control system 19, filler control system 29, configurator 400, and HMI module 9*a*, the process adjustment means 200 calculates process parameters that are used to control the filling device 20. Focusing on the filling device 20, the following process parameters, for example, may be set automatically: filling pressure, pressurisation time, pressurisation pressure, filling rate, filling curve, depressurisation time and/or tank pressure. The process parameters optimised in this way may be assigned to a product type or structured in another way. Furthermore, the calculated process parameters may either be used directly to control the filling device, or the process parameters are written to the corresponding control means, thereby influencing the handling process. The process parameters optimised to control the filling device 20 may be saved for later use, for example in a local storage or cloud storage 500.

The optimisation by the process adjustment means 200 may be effected at regular intervals, for example every minute, and/or triggered by an event. Such an event may be triggered, for example, by the real-time process data, for instance if a threshold value is exceeded or not attained, or by a change in the configuration data.

The filling process optimisation is effected on different levels that are logically, spatially or otherwise separated from each other or may differ from each other. Thus, the container production control system 19, filler control system 29, filling device 20 and the corresponding sensor technology for obtaining the real-time process data are a constituent part of the beverage filling plant 1, while the process adjustment means 200 for automatic process adjustment, the configurator 400, the HMI module 9*a*, with any user app 9*b*, and the cloud storage 500 may be located elsewhere, i.e. physically separated from the beverage filling plant 1.

As an example, the schematic diagram of FIG. 4 is limited to real-time optimisation of the filling device 20. It is apparent, however, that the processing of alternative or additional container handling stations of the container handling plant, or beverage filling plant 1, may be optimised in an analogous manner. Furthermore, additional or alternative real-time process data may be used for optimisation.

A plant optimised in this way operates in a substantially more stable manner overall. Commissioning, a change of product type, troubleshooting, etc. are substantially faster and safer.

Substantially less expertise is required at the location of the beverage filling plant 1 to commission and reliably operate the beverage filling plant 1, since the configuration and control of the plant are at least partially outsourced to external means. This reduces the amount of training required and causes fewer problems in the event of any personnel fluctuations on the part of the users of beverage filling plant 1. The centralised optimisation helps to reduce rejects on the customer side.

A central feedback of data from the beverage filling plant 1 and the associated processing is implemented, which allows for designs based on real values in the field. This "feedback loop" accelerates product development and product improvement on the manufacturer's side, as a stream of real data from practical application is now available for plant designs, laboratories, and new and further developments.

As far as applicable, all individual features represented in the exemplary embodiments can be combined and/or exchanged with each other without departure from the scope of the invention

What is claimed is:

1. A system comprising:

a container handling plant comprising:

a container handling station configured to handle containers; and an assigned control means configured to control a container handling process of the container handling station;

a means for automatic process adjustment, wherein the means for automatic process adjustment is configured to:

receive, from the assigned control means, real-time process data acquired by one or more sensors of the container handling plant;

determine at least one process parameter based on the received real-time process data; and write the determined at least one process parameter to the assigned control means, resulting in adjustment of the container handling process of the container handling station; and a development means that is in communication with the means for automatic process adjustment, wherein the development means is configured to acquire the real-time process data and to use the real-time process data to develop calculation rules for calculating the at least one process parameter.

2. The system of claim 1, further comprising a human machine interface (HMI) module that is a constituent part of or in communication with the assigned control means, wherein the HMI module is configured to receive user input relating to the container handling process, to generate user data from the user input, and to send the user data to the means for automatic process adjustment.

3. The system of claim 2, wherein the means for automatic process adjustment is further configured to further determine the at least one process parameter based on the generated user data.

4. The system of claim 2, wherein the HMI module comprises a portable means.

5. The system of claim 2, wherein the development means is further configured to acquire the user data, and to use the user data to develop calculation rules for calculating the at least one process parameter by use of self-learning algorithms.

6. The system of claim 1, further comprising a configurator that is configured to send configuration data to the means for automatic process adjustment, wherein the means for automatic process adjustment is further configured to receive the configuration data and to further determine the at least one process parameter based on the received configuration data.

7. The system of claim 1, wherein the container handling station comprises a filling device configured to fill containers with a fill product.

8. The system of claim 7, wherein the fill product comprises a beverage.

9. The system of claim 7, wherein:

the at least process parameter comprises one or more of: a filling pressure, a pressurization time, a pressurization pressure, a filling rate, a filling curve (K), a depressurization time, and/or a tank pressure; and/or the real-time process data comprises information relating to one or more of the following variables: a Brix level of the fill product, a $CO_2$ content of the fill product, a fill product temperature, a fill level, or a headspace volume of a filled container.

* * * * *